(12) United States Patent
Alemzadeh et al.

(10) Patent No.: US 11,080,409 B2
(45) Date of Patent: Aug. 3, 2021

(54) SSD CONTENT ENCRYPTION AND AUTHENTICATION

(71) Applicant: NGD SYSTEMS, INC., Irvine, CA (US)

(72) Inventors: Vahab Alemzadeh, Mission Viejo, CA (US); Hermes Costa, Mission Viejo, CA (US); Vladimir Alves, Tustin, CA (US)

(73) Assignee: NGD Systems, Inc., Irvnie, CA (US)

( * ) Notice: Subject to any disclaimer, the term of this patent is extended or adjusted under 35 U.S.C. 154(b) by 41 days.

(21) Appl. No.: 16/676,318

(22) Filed: Nov. 6, 2019

(65) Prior Publication Data

US 2020/0143067 A1 May 7, 2020

Related U.S. Application Data

(60) Provisional application No. 62/757,070, filed on Nov. 7, 2018.

(51) Int. Cl.
*G06F 21/60* (2013.01)
*G06F 3/06* (2006.01)
*H04L 9/06* (2006.01)
*G06F 21/79* (2013.01)
*G06F 21/78* (2013.01)

(52) U.S. Cl.
CPC .......... *G06F 21/602* (2013.01); *G06F 3/0604* (2013.01); *G06F 3/0623* (2013.01); *G06F 3/0679* (2013.01); *G06F 21/78* (2013.01); *G06F 21/79* (2013.01); *H04L 9/0618* (2013.01)

(58) Field of Classification Search
None
See application file for complete search history.

(56) References Cited

U.S. PATENT DOCUMENTS

| 7,766,244 B1* | 8/2010 | Field | G06Q 20/357 235/493 |
| 8,464,073 B2* | 6/2013 | Salessi | G06F 21/31 380/28 |
| 9,069,703 B2* | 6/2015 | Raam | G06F 21/606 |

(Continued)

OTHER PUBLICATIONS

No stated author; Netgear ReadyNAS OS 6.1 Software Manual; 2013; Retrieved from the Internet http://www.downloads.netgear.com/files/GDC/READYNAS-100/ReadyNAS%20OS6.1%20SW%20UM16Oct2013.pdf; pp. 1-276 as printed. (Year: 2013).*

(Continued)

*Primary Examiner* — Michael W Chao
(74) *Attorney, Agent, or Firm* — Lewis Roca Rothgerber Christie LLP

(57) ABSTRACT

A storage device. In some embodiments, the storage device includes a storage interface, configured to be connected to a host computer, a processing circuit, and persistent storage media. The processing circuit may be configured to: read first data from the persistent storage media in response to a read command received through the storage interface; transmit second data through the storage interface, the second data being based on the first data; receive a write command, with third data, through the storage interface; write fourth data, based on the third data, to the persistent storage media; and perform a cryptographic operation on the first data or on the third data.

18 Claims, 3 Drawing Sheets

(56) References Cited

U.S. PATENT DOCUMENTS

| | | | | |
|---|---|---|---|---|
| 9,076,004 | B1* | 7/2015 | Bogorad | G06F 21/602 |
| 9,152,825 | B2* | 10/2015 | Sarcone | G06F 21/85 |
| 9,361,245 | B2* | 6/2016 | Jones | G06F 12/1416 |
| 9,537,657 | B1* | 1/2017 | Char | H04L 9/3226 |
| 10,129,219 | B1* | 11/2018 | Paul | H04L 63/0471 |
| 10,628,353 | B2* | 4/2020 | Prabhakar | H04L 49/9005 |
| 10,846,155 | B2* | 11/2020 | Kachare | G06F 13/4221 |
| 10,855,451 | B1* | 12/2020 | Allo | G06F 21/78 |
| 10,872,333 | B2* | 12/2020 | Dua | G06Q 20/327 |
| 10,929,572 | B2* | 2/2021 | Wu | G06F 21/80 |
| 2004/0210320 | A1* | 10/2004 | Pandya | H04L 29/06 700/1 |
| 2007/0143592 | A1* | 6/2007 | Kitani | G06F 21/606 713/150 |
| 2008/0126813 | A1* | 5/2008 | Kawakami | G06F 21/72 713/193 |
| 2008/0192928 | A1* | 8/2008 | Yu | G06F 21/85 380/44 |
| 2010/0106581 | A1* | 4/2010 | Etheredge | G06Q 30/02 705/14.17 |
| 2012/0116902 | A1* | 5/2012 | Cardina | G06Q 20/204 705/17 |
| 2012/0310774 | A1* | 12/2012 | Chassin | G06Q 20/227 705/26.41 |
| 2013/0227301 | A1* | 8/2013 | Sarcone | G06F 21/85 713/189 |
| 2013/0276091 | A1* | 10/2013 | Saxena | G06F 21/80 726/11 |
| 2013/0290736 | A1* | 10/2013 | Kudoh | H04L 9/10 713/189 |
| 2014/0040639 | A1* | 2/2014 | Raam | G06F 21/606 713/193 |
| 2014/0310574 | A1* | 10/2014 | Yu | G11C 29/72 714/773 |
| 2015/0293858 | A1* | 10/2015 | Raam | G06F 21/606 713/193 |
| 2016/0162889 | A1* | 6/2016 | Badenhorst | G06Q 20/42 705/44 |
| 2016/0239666 | A1* | 8/2016 | Obukhov | G06F 21/602 |
| 2016/0342532 | A1* | 11/2016 | Peacock | G06F 21/6218 |
| 2017/0177222 | A1* | 6/2017 | Singh | G06F 3/061 |
| 2017/0317991 | A1* | 11/2017 | Lionetti | G06F 12/1408 |
| 2018/0095915 | A1* | 4/2018 | Prabhakar | G06F 9/455 |
| 2018/0181499 | A1* | 6/2018 | Branco | G06F 11/1048 |
| 2018/0183581 | A1* | 6/2018 | Elbaz | H04L 63/061 |
| 2018/0225230 | A1* | 8/2018 | Litichever | G06F 21/82 |
| 2018/0341606 | A1* | 11/2018 | Bolkhovitin | G06F 3/0656 |
| 2018/0365451 | A1* | 12/2018 | Ndu | G06F 21/72 |
| 2019/0163364 | A1* | 5/2019 | Gibb | G06F 3/0629 |
| 2019/0220617 | A1* | 7/2019 | Harriman | G06F 21/6218 |
| 2019/0266103 | A1* | 8/2019 | Pearson | H04L 9/0897 |
| 2020/0050800 | A1* | 2/2020 | Schauer | G06F 21/72 |
| 2020/0210069 | A1* | 7/2020 | Singh | G06F 9/45558 |
| 2021/0004797 | A1* | 1/2021 | Makhotin | G06Q 20/326 |

OTHER PUBLICATIONS

Freier et al.; The Secure Sockets Layer (SSL) Protocol Version 3.0; 2011; Retrieved from the internet https://tools.ietf.org/pdf/rfc6101.pdf; pp. 1-67 as printed. (Year: 2011).*

* cited by examiner

SSD CONTENT ENCRYPTION AND AUTHENTICATION

CROSS-REFERENCE TO RELATED APPLICATION(S)

The present application claims priority to and the benefit of U.S. Provisional Application No. 62/757,070, filed Nov. 7, 2018, entitled "SSD CONTENT ENCRYPTION AND AUTHENTICATION", the entire content of which is incorporated herein by reference.

FIELD

One or more aspects of embodiments according to the present disclosure relate to persistent storage, and more particularly to a system and method for in-storage encryption and authentication.

BACKGROUND

Transfers of data from a server to a client, or from a client to a server, may, in various circumstances, be performed using encrypted data and authentication tags, to avoid unauthorized access to or use of the data, and to avoid substitution of unauthorized data by an impostor.

In some related art systems, data is stored in clear form (i.e., in a form that is not encrypted) in persistent storage in the server. When a request for data is received from a client, the unencrypted data is retrieved, by the server, from persistent storage in or connected to the server, and stored in server local memory. The data is fetched, piecewise, from the server local memory, and encrypted, by the server central processing unit (CPU), and the encrypted data is saved back to the server local memory. The encrypted data is then transmitted, from the server local memory, through a network interface card (NIC) of the server to the client.

In some related art systems, when a client sends encrypted data to be stored on the server, the encrypted data is received by the network interface card and stored in the server local memory. The data is then fetched, piecewise, from the server local memory, and decrypted, by the server central processing unit, and the decrypted data is saved back to the server local memory. The decrypted data is then fetched, from the server local memory, and stored in the persistent storage.

These processes burden the server CPU and the server local memory. Moreover, especially if the server CPU is a general purpose CPU that performs encryption by executing a suitable set of encryption instructions that are stored in memory, these processes may be slow, e.g., the data throughput of these processes may be poor and latency may be high. Thus, there is a need for an improved system and method for encryption and authentication.

SUMMARY

According to an embodiment of the present invention, there is provided a storage device, including: a storage interface, configured to be connected to a host computer; a processing circuit; and persistent storage media, the processing circuit being configured to: read first data from the persistent storage media in response to a read command received through the storage interface; transmit second data through the storage interface, the second data being based on the first data; receive a write command, with third data, through the storage interface; write fourth data, based on the third data, to the persistent storage media; and perform a cryptographic operation on the first data or on the third data.

In some embodiments, the cryptographic operation is performed on the first data and includes encrypting the first data to form the second data and an authentication tag.

In some embodiments, the processing circuit is further configured to retrieve an encryption key, and to perform the cryptographic operation with the encryption key.

In some embodiments, the cryptographic operation is performed on the third data and includes decrypting the third data to form the fourth data.

In some embodiments, the processing circuit is further configured to retrieve an encryption key, and to perform the cryptographic operation with the encryption key.

In some embodiments, the persistent storage media includes flash memory.

In some embodiments, the processing circuit includes a dedicated encryption circuit, and the performing of the cryptographic operation includes performing the cryptographic operation by the dedicated encryption circuit.

In some embodiments, the dedicated encryption circuit includes a hardware encryption engine.

According to an embodiment of the present invention, there is provided a method, including: reading, by a storage device, first data from persistent storage media in the storage device, in response to a read command received through a storage interface of the storage device; transmitting second data through the storage interface, the second data being based on the first data; receiving a write command, with third data, through the storage interface; writing fourth data, based on the third data, to the persistent storage media; and performing a cryptographic operation on the first data or on the third data.

In some embodiments, the cryptographic operation is performed on the first data and includes encrypting the first data to form the second data and an authentication tag.

In some embodiments, the method further includes retrieving an encryption key, wherein the performing of the cryptographic operation includes performing the cryptographic operation with the encryption key.

In some embodiments, the cryptographic operation is performed on the third data and includes decrypting the third data to form the fourth data.

In some embodiments, the method further includes retrieving an encryption key, wherein the performing of the cryptographic operation includes performing the cryptographic operation with the encryption key.

In some embodiments, the persistent storage media includes flash memory.

In some embodiments, the storage device includes a dedicated encryption circuit, and the performing of the cryptographic operation includes performing the cryptographic operation by the dedicated encryption circuit.

In some embodiments, the dedicated encryption circuit includes a hardware encryption engine.

BRIEF DESCRIPTION OF THE DRAWINGS

These and other features and advantages of the present disclosure will be appreciated and understood with reference to the specification, claims, and appended drawings wherein:

DETAILED DESCRIPTION

The detailed description set forth below in connection with the appended drawings is intended as a description of exemplary embodiments of a system and method for in-storage encryption and authentication provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

Figure 1:
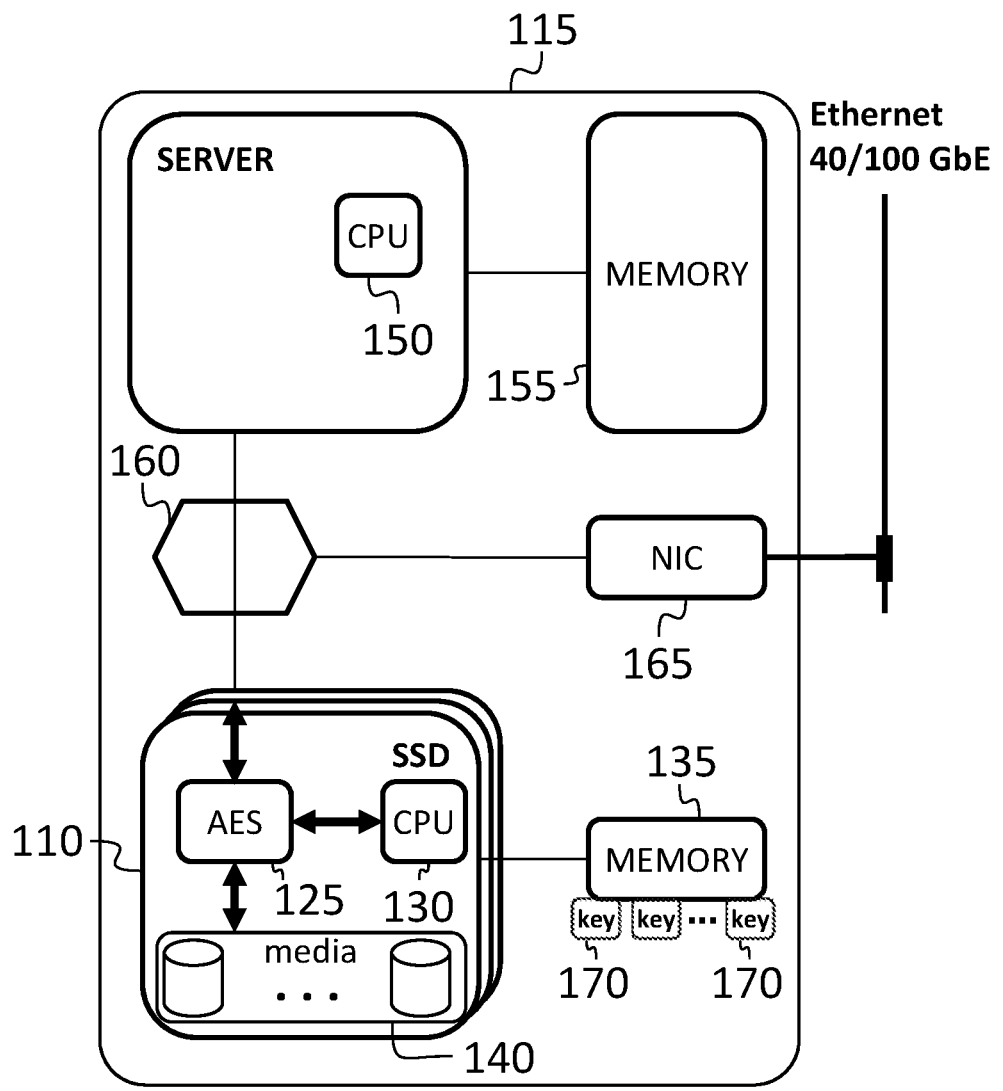
FIG. 1 is a block diagram of a host and persistent storage device, according to an embodiment of the present disclosure.

Referring to FIG. 1, in some embodiments a storage device, e.g., a solid state drive (SSD) 110, is connected to a host 115, e.g., a server or other computer, and the SSD provides storage for the host 115. If the SSD 110 is in the same enclosure as the other components of the host 115, it is nonetheless considered a separate element from the "host" for purposes of this disclosure, and the "host" may be, for example, the components in the enclosure other than the SSD 110. In some embodiments, additional SSDs (which may be like the SSD 110) are also connected to the host 115. The interface (or "storage interface") through which the SSD connects to the host (including a storage connector on the SSD, and the communications protocols associated with the storage interface) may be, for example, Serial Advanced Technology Attachment (SATA), Fibre Channel, Small Computer System Interface (SCSI), Serial Attached SCSI (SAS), Peripheral Component Interconnect Express (PCIe), Non Volatile Memory Express (NVMe), NVMe over Fabrics (NVMeOF), SCSI over PCIe, or a more general-purpose interface such as Ethernet or Universal Serial Bus (USB). In some embodiments, the solid state drive 110 may conform to a 3.5 inch hard drive form-factor (or "large form factor" (LFF)) standard, or to a 2.5 inch hard drive form-factor (or small form factor (SFF)) standard, or to an M.2 module form factor standard, or to an EDSFF 1 U Short (E1.S) form factor standard, or to an EDSFF 1 U Long (E1.L) form factor standard, or to an EDSFF 3" (E3) form factor standard. In other embodiments the solid state drive 110 may conform to a standard PCIe card form factor, e.g., a full-height, full length (FH-FL) card outline, or a full-height, half length (FH-HL) outline.

The SSD 110 may include a computational storage unit, which in turn may include (i) a dedicated encryption circuit 125 (e.g., a dedicated circuit for performing AES (Advanced Encryption Standard) encryption or decryption) and (ii) an SSD CPU 130. The SSD may further include SSD memory 135 and persistent storage media 140 (e.g., one or more flash memory dies or chips). The SSD memory is illustrated, in FIG. 2A (and in FIG. 2B), as being outside of the boundaries of the SSD, but it may be part of the SSD (e.g., it may be within the same enclosure (or on the same circuit board) as the other parts of the SSD). The host 115 may include a host CPU 150, a host memory 155, a PCIe switch 160, and a network interface card (NIC) 165.

Figure 2A:
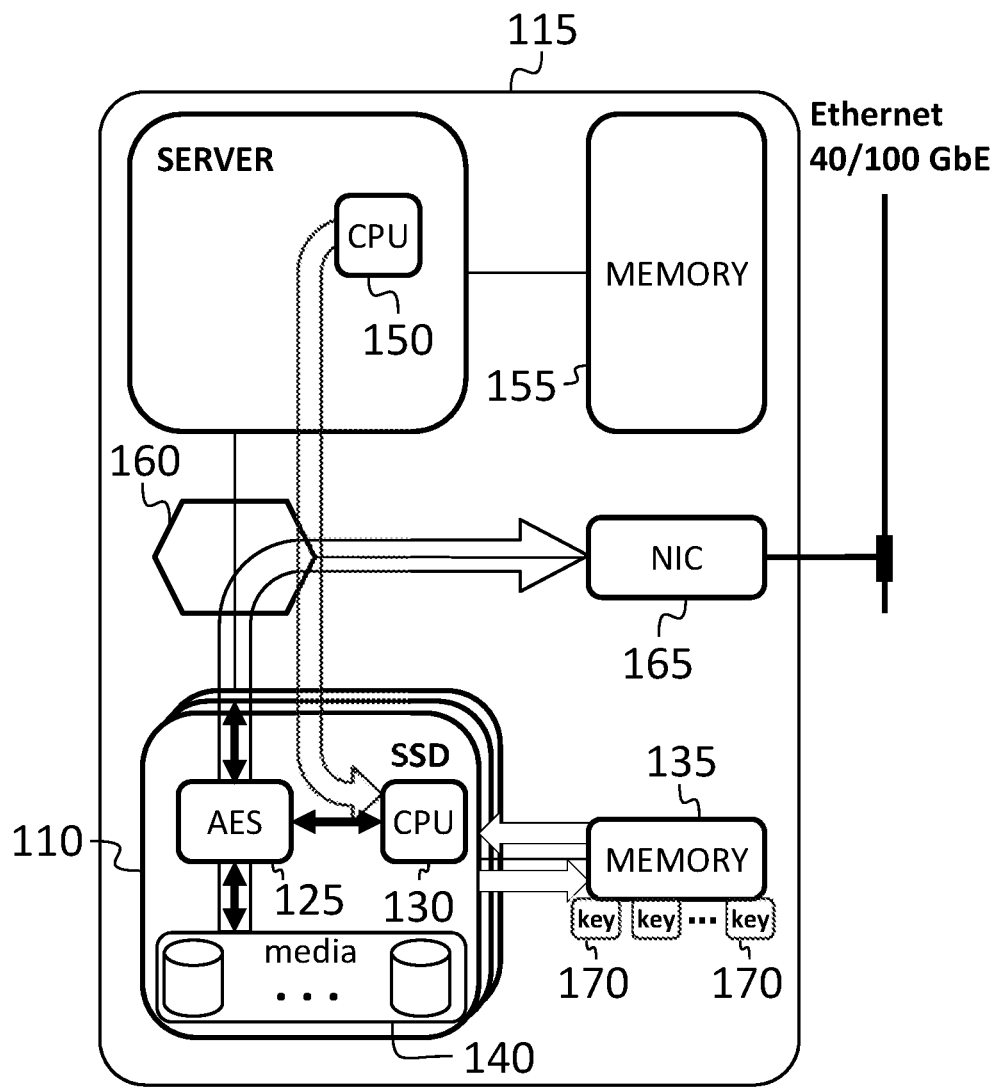
FIG. 2A is data flow diagram, according to an embodiment of the present disclosure.

FIG. 2A shows data flow in the system, in some embodiments, when encrypted data is to be transmitted. The host CPU 150 (e.g., in response to a request received, by the server, from a client) issues a read command along with a user identifier "user ID" to the computational storage unit (CSU) of the SSD. The computational storage unit may include a dedicated encryption circuit 125 (e.g., a dedicated circuit for performing AES (Advanced Encryption Standard) encryption or decryption) and an SSD CPU 130. A plurality of encryption keys 170 may be stored in the SSD memory 135. These encryption keys 170 may be indexed by user ID. Copies of encryption keys 170 that are stored in SSD memory 135 may be volatile, and may be lost once the SSD 110 is power cycled. Therefore, a copy of these keys may also be stored in the persistent storage media 140, and restored to the SSD memory 135 after an SSD power up.

In response to the read command received from the host 115, the CSU may look up an encryption key in the SSD memory 135, using the user ID. The encryption keys 170 may themselves be stored in the SSD memory 135 in encrypted form (encrypted using an authentication key). Once an encrypted encryption key is looked up and passed to the dedicated encryption circuit 125, the dedicated encryption circuit 125 decrypts the encryption key before using it. The requested data may then be read from the persistent storage media 140 in unencrypted (clear) form, and encrypted by the dedicated encryption circuit 125. In some embodiments, an authentication tag is generated by the encryption process, and transmitted through the network interface card 165, along with the encrypted data. The authentication tag may be used by the client to authenticate the received data.

The method of operation illustrated in FIG. 2A may have several advantages. For example, the host CPU 150 is not burdened by the encryption operation, in which the host CPU 150 does not participate directly. Moreover, the encryption may be performed at significantly higher throughput and lower latency by the dedicated encryption circuit 125 than may be feasible using a typical host CPU 150. In some embodiments, the dedicated encryption circuit 125 is or includes a hardware encryption engine capable of performing operations at line speed or at near line speed (e.g., at between 50% and 100% of line speed, or at between 90% and 95% of line speed, e.g., at 92% of line speed or more), e.g., at an encryption rate of over 2 GB/s (e.g., at an encryption rate of about 3.6 GB/s). As used herein, "line speed", for a processing engine such as the hardware encryption engine, means the speed at which the system is capable of feeding data into, and receiving processed data from, the processing engine.

In some embodiments, the hardware encryption engine is, or is a portion of, an application specific integrated circuit (ASIC), e.g., a CMOS ASIC. As used herein, a "hardware encryption engine" is a circuit that executes encryption or decryption instructions all of which are hard-coded, i.e., none of which are read from memory, although parameters or data may be read from memory or stored in registers in the hardware encryption engine. In some embodiments, the hardware encryption engine runs with a clock frequency that is between 2.0 and 5.0 times as fast as the clock frequency of the SSD core (the part of the SSD CPU 130 that configures the hardware encryption engine). In some embodiments, the SSD core operates at about 250 MHz and the hardware encryption engine operates at about 800 MHz. At the clock domain crossings between these two clock domains, synchronizers may be used for the control plane, and pipelining for the data plane. In other embodiments the dedicated encryption circuit is a stored-instruction computer (that may be designed to be efficient at encryption or decryption operations) that reads instructions from memory and executes them.

In some embodiments, the encrypted data are directly sent from the computational storage unit to the client, as in the embodiment of FIG. 2A. In such an embodiment, a PCIe switch may connect a PCIe root complex connected to the host CPU 150 to (i) the computational storage unit, and to (ii) the network interface card 165. The host CPU 150 may then operate as the PCIe master, and it may instruct the SSD 110 to read and encrypt a quantity of data, and to save it to a range of memory locations. The range of memory locations may be mapped to the network interface card 165, so that when the SSD 110 follows the instructions, the result is that the encrypted data are directly transmitted through the network interface card 165.

The authentication tag may be sent with every piece of encrypted data. For instance, when using transport layer security (TLS), the tag may be sent with each TLS record frame. A large file may be encrypted into several TLS record frames. The maximum size of a TLS record may be 16 KB, while a typical MTU (maximum transmission unit) for ethernet is 1500 B. One TLS record containing up to 16 KB of encrypted data and one tag may therefore be fragmented into several packets of 1500 B. The TLS record size is not fixed and can be dynamically modified to optimize network utilization depending on the MTU, latency, speed and retransmission rate.

The system and method illustrated in FIG. 2A may be used, for example, by a provider of video to customers, each of whom may have a user ID and a corresponding encryption key. In such an application, a client operated by a user may send the server the user's user ID and request a segment of video, and the server may send, to the client, (i) the segment of video, encrypted using the encryption key corresponding to the user ID, and (ii) the associated authentication tag.

Figure 2B:
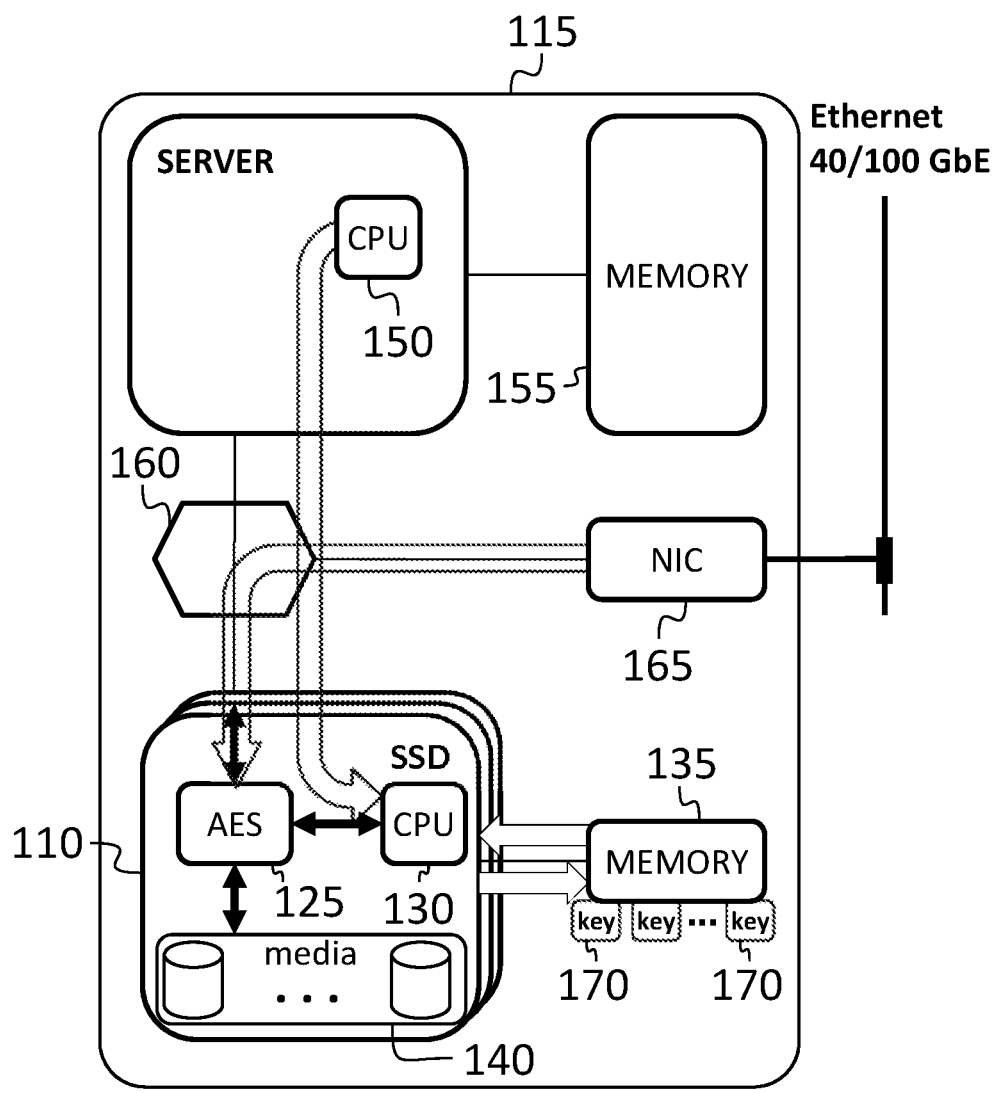
FIG. 2B is data flow diagram, according to an embodiment of the present disclosure.

Referring to FIG. 2B, in some embodiments an SSD 110 may be configured to decrypt received data in an analogous manner. In some embodiments, encrypted data arriving from the client is transferred directly to the storage device, and decrypted and authenticated at near line speed, using an encryption key stored in the SSD memory 135, indexed by user ID. The decrypted data is then saved to the persistent storage media 140. The method of operation illustrated in FIG. 2B may have the same advantages as those of the method of operation illustrated in FIG. 2A, e.g., the burden on the host CPU 150 may be reduced, the throughput may be increased, and the latency may be reduced. In some embodiments, an SSD 110 is capable of performing both the method of operation of FIG. 2A and the method of operation of FIG. 2B as a result of having a dedicated encryption circuit 125 capable of performing both encryption and decryption, or as a result of including two dedicated encryption circuits 125, one of which is capable of performing encryption and the other of which is capable of performing decryption.

The dedicated encryption circuit 125 of the embodiment of FIG. 2B may have similar characteristics to those ascribed to the dedicated encryption circuit 125 of the embodiment of FIG. 2A (in the description of FIG. 2A above), except that the dedicated encryption circuit 125 of the embodiment of FIG. 2B may be configured to decrypt data being stored in the persistent storage media 140, instead of, or in addition to, being configured to encrypt data being retrieved from the persistent storage media 140. For example, the dedicated encryption circuit 125 of the embodiment of FIG. 2B may be a hardware encryption engine configured to operate at a higher clock rate than the SSD core.

In some embodiments a system analogous to that of FIG. 2A or 2B is employed to store encrypted data in the persistent storage media 140 for security reasons. In such an embodiment, the dedicated encryption circuit 125 may encrypt data when it is being stored in the persistent storage media 140, or decrypt data when it is being retrieved from the persistent storage media 140, or both. In such an embodiment the storage device may operate as an electronic safe of virtual data, without incurring the processing overhead otherwise needed to encrypt and decrypt the data on the host.

The system and method illustrated in FIG. 2B may be used, for example, by a provider of video to send video segments to a proxy server located near a plurality of customers. The video segments may be sent to the server in encrypted form, be decrypted by the server (e.g., using a method according to the illustration of FIG. 2B) and be stored unencrypted on the server. When a customer requests one of the video segments, the server may re-encrypt the requested video segment (using the encryption key associated with the customer's user ID), using a method according to the illustration of FIG. 2A, and send the encrypted segment of video to the customer.

The singular and plural constructions of the word "data" are used interchangeably herein. As used herein, when a second quantity (e.g., second data) is referred to as being "based on" a first quantity (e.g., first data) it means that the first quantity influences the second quantity, e.g., the first quantity may be an input (e.g., the only input, or one of several inputs) to a function that calculates the second quantity, or the second quantity may be equal to the first quantity, or the second quantity may be the same as (e.g., stored at the same location or locations in memory) as the first quantity.

As used herein, the word "or" is inclusive, so that, for example, "A or B" means any one of (i) A, (ii) B, and (iii) A and B. It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" or "between 1.0 and 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

One or more of the circuits in the host or in the SSD (e.g., the dedicated encryption circuit 125) may be, or may be part of, one or more processing circuits. The term "processing circuit" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example a processing circuit may include two processing circuits, an FPGA and a CPU, interconnected on a PCB.

As used herein, a cryptographic operation is an encryption operation or a decryption operation, and it may also include the generation of an authentication tag.

As used herein, a "dedicated encryption circuit" is a dedicated circuit for performing encryption or a dedicated circuit for performing decryption, or a dedicated circuit capable of both performing encryption and performing decryption. Similarly, as used herein, a "hardware encryption engine" is a hardware engine for performing encryption or a hardware engine for performing decryption, or a hardware engine capable of both performing encryption and performing decryption. As used herein, an "encryption key" is a key for performing encryption or for performing decryption. Although some examples are provided herein in which the storage device (or "persistent storage device") is an SSD, in some embodiments it is another kind of persistent storage device, e.g., a hard drive.

Although exemplary embodiments of a system and method for in-storage encryption and authentication have been specifically described and illustrated herein, many modifications and variations will be apparent to those skilled in the art. Accordingly, it is to be understood that a system and method for in-storage encryption and authentication constructed according to principles of this disclosure may be embodied other than as specifically described herein. The invention is also defined in the following claims, and equivalents thereof.

What is claimed is:

1. A storage device, comprising:
a storage interface, configured to be connected, through a storage interface switch of a host computer:
to a processor of the host computer, and
to a network adapter of the host computer;
a processing circuit; and
persistent storage media,
the processing circuit being configured to:
read first data from the persistent storage media in response to a read command received, from the processor, through the storage interface switch, and through the storage interface, the first data being unencrypted;
transmit second data through the storage interface, through the storage interface switch, and through a network interface using the network adapter, the second data being based on the first data;
receive a write command, with third data, through the storage interface;
write fourth data, based on the third data, to the persistent storage media, the fourth data being unencrypted; and
perform a cryptographic operation on the first data or on the third data.

2. The storage device of claim 1, wherein the cryptographic operation is performed on the first data and comprises encrypting the first data to form the second data and an authentication tag.

3. The storage device of claim 2, wherein the processing circuit is further configured to retrieve an encryption key, and to perform the cryptographic operation with the encryption key.

4. The storage device of claim 1, wherein the cryptographic operation is performed on the third data and comprises decrypting the third data to form the fourth data.

5. The storage device of claim 4, wherein the processing circuit is further configured to retrieve an encryption key, and to perform the cryptographic operation with the encryption key.

6. The storage device of claim 1, wherein the persistent storage media comprises flash memory.

7. The storage device of claim 1, wherein the processing circuit comprises a dedicated encryption circuit, and the performing of the cryptographic operation comprises performing the cryptographic operation by the dedicated encryption circuit.

8. The storage device of claim 7, wherein the dedicated encryption circuit comprises a hardware encryption engine.

9. The storage device of claim 1, wherein:
the processing circuit is further configured to transmit the second data directly to the network adapter, and
the processing circuit is further configured to receive the third data directly from the network adapter.

10. A method, comprising:
reading, by a storage device, first data from persistent storage media in the storage device, in response to a read command received from a processor of a host computer, through a storage interface switch of the host computer, and through a storage interface of the storage device, the first data being unencrypted;

transmitting second data through the storage interface, through the storage interface switch, and through a network adapter of the host computer, the second data being based on the first data;

receiving a write command, with third data, through the storage interface;

writing fourth data, based on the third data, to the persistent storage media, the fourth data being unencrypted; and performing a cryptographic operation on the first data or on the third data, wherein the storage interface is connected, through the storage interface switch:
  to a processor of the host computer, and to
  the network adapter of the host computer.

11. The method of claim 10, wherein the cryptographic operation is performed on the first data and comprises encrypting the first data to form the second data and an authentication tag.

12. The method of claim 11, further comprising retrieving an encryption key, wherein the performing of the cryptographic operation comprises performing the cryptographic operation with the encryption key.

13. The method of claim 10, wherein the cryptographic operation is performed on the third data and comprises decrypting the third data to form the fourth data.

14. The method of claim 13, further comprising retrieving an encryption key, wherein the performing of the cryptographic operation comprises performing the cryptographic operation with the encryption key.

15. The method of claim 10, wherein the persistent storage media comprises flash memory.

16. The method of claim 10, wherein the storage device comprises a dedicated encryption circuit, and the performing of the cryptographic operation comprises performing the cryptographic operation by the dedicated encryption circuit.

17. The method of claim 16, wherein the dedicated encryption circuit comprises a hardware encryption engine.

18. The method of claim 10, wherein:
  the transmitting of the second data through the storage interface comprises transmitting the second data directly, by the storage device, to the network adapter; and
  the receiving of the write command, with third data, comprises receiving the third data directly, by the storage device, from the network adapter.

* * * * *